United States Patent
Crim (10) Patent No.: US 8,330,074 B2
(45) Date of Patent: Dec. 11, 2012

(54) METHOD AND APPARATUS FOR VERIFYING A LASER ETCH

(75) Inventor: James Daniel Crim, Rockvale, TN (US)

(73) Assignee: Bridgestone America Tire Operations, LLC, Nashville, TN (US)

( * ) Notice: Subject to any disclaimer, the term of this patent is extended or adjusted under 35 U.S.C. 154(b) by 749 days.

(21) Appl. No.: 12/504,115

(22) Filed: Jul. 16, 2009

(65) Prior Publication Data

US 2011/0013177 A1   Jan. 20, 2011

(51) Int. Cl.
*B23K 26/36* (2006.01)
(52) U.S. Cl. .......... 219/121.68; 219/121.69; 219/121.83
(58) Field of Classification Search ............. 219/121.68, 219/121.69, 121.83
See application file for complete search history.

(56) References Cited

U.S. PATENT DOCUMENTS

| 5,261,822 | A * | 11/1993 | Hall et al. ................. 434/271 |
| 5,603,796 | A | 2/1997 | Baker |
| 5,895,845 | A | 4/1999 | Burger |
| 6,237,907 | B1 * | 5/2001 | Lawrence ................. 269/287 |
| 6,331,993 | B1 * | 12/2001 | Brown ...................... 372/55 |
| 7,046,711 | B2 * | 5/2006 | Kopf et al. ................. 372/75 |
| 7,093,758 | B2 | 8/2006 | Oyama et al. |
| 7,158,241 | B2 | 1/2007 | Slesinski |
| 7,295,948 | B2 | 11/2007 | Jetter |
| 2002/0108398 | A1 * | 8/2002 | Smith et al. ................. 63/32 |
| 2003/0179430 | A1 * | 9/2003 | Kurosawa ................... 359/212 |
| 2004/0102764 | A1 * | 5/2004 | Balling ...................... 219/121.83 |
| 2006/0151451 | A1 * | 7/2006 | Smith, Jr. et al. ........ 219/121.68 |
| 2006/0161381 | A1 * | 7/2006 | Jetter ............................ 702/155 |
| 2008/0078751 | A1 * | 4/2008 | Abrott ..................... 219/121.69 |
| 2008/0156778 | A1 * | 7/2008 | Lin et al. .................. 219/121.68 |
| 2010/0051793 | A1 * | 3/2010 | Riedel et al. ............... 250/252.1 |

FOREIGN PATENT DOCUMENTS

| JP | 2-263583 A | * | 10/1990 |
| JP | 6-15468 A | * | 1/1994 |
| JP | 7-178842 A | * | 7/1995 |
| JP | 10-58175 A | * | 3/1998 |
| JP | 2000084681 | | 3/2000 |
| JP | 2001-133324 A | * | 5/2001 |
| JP | 2003-94187 A | * | 4/2003 |
| JP | 2007516103 | | 6/2007 |
| KR | 1020010063742 | | 7/2001 |

OTHER PUBLICATIONS

Machine translation of Japan Patent document No. 10-58,175, Oct. 2012.* Machine translation of Japan Patent document No. 2003-94,187,Oct. 2012.*
Hong, Sung Ui, International Search Report and Written Opinion for International Patent Application PCT/US2010/041819, Feb. 17, 2011, pp. 1-9, Korean Intellectual Property Office, Korea.

* cited by examiner

Primary Examiner — Geoffrey S Evans (57) ABSTRACT

An apparatus and method for verifying a laser etch on a rubber sample. In one embodiment, the apparatus includes a tire production line, a sample holding device, a laser having a diode, and a servo-assembly. The laser of the apparatus is configured to etch indicia on a sidewall of a tire on the tire production line and is further configured to etch at least one line in a rubber sample on the sample holding device. In one embodiment, the method includes etching a production tire with a laser, interrupting the laser, moving the laser to a laser diode testing location, loading a rubber sample in a holding device, etching at least one line into the rubber sample with the laser, manually or automatically measuring a depth of the at least one line, and comparing the depth of the at least one line to an acceptable line depth range.

20 Claims, 8 Drawing Sheets

METHOD AND APPARATUS FOR VERIFYING A LASER ETCH

FIELD OF INVENTION

The present application is directed to a laser diode testing method. More particularly, the present application is directed to a method of testing a laser diode using a sample and measuring process.

BACKGROUND

Laser etching systems include a laser having a laser diode. Laser etching systems may be used in various industries to etch markings or indicia on an object. Laser etching may be performed on polymeric materials, metals, stone, glass, and natural materials, such as wood, hard papers, fiberboards, and leather. Laser etching may also be performed on rubber and composite materials. In particular, laser etching may be performed on a sidewall of a tire to etch a barcode, a date, or other indicia.

SUMMARY

An apparatus for verifying a laser etch on a rubber sample is described herein. The apparatus includes a tire production line, a sample holding device, a laser having a diode, and a servo-assembly. The laser of the apparatus is configured to etch indicia on a sidewall of a tire and is further configured to etch at least one line in a rubber sample on the sample holding device.

A method for verifying a laser etch is also described. The method includes etching a production tire with a laser, interrupting the laser, and moving the laser to a laser diode testing location. The method further includes loading a rubber sample in a holding device, etching at least one line into the rubber sample with the laser. In one embodiment, the method also includes manually measuring a depth of the at least one line, and comparing the depth of the at least one line to an acceptable line depth range. In another embodiment, the method includes measuring a depth of the at least one line with an automated depth sensor.

BRIEF DESCRIPTION OF THE DRAWINGS

In the accompanying drawings, embodiments of a laser diode testing system and method are illustrated that, together with the detailed description provided below, describe exemplary embodiments of laser diode testing systems and methods. One of ordinary skill in the art will appreciate that a step may be designed as multiple steps or that multiple steps may be designed as a single step.

Further, in the accompanying drawings and description that follow, like parts are indicated throughout the drawings and written description with the same reference numerals, respectively. The figures are not drawn to scale and the proportions of certain parts have been exaggerated for convenience of illustration.

DETAILED DESCRIPTION

Figure 1:
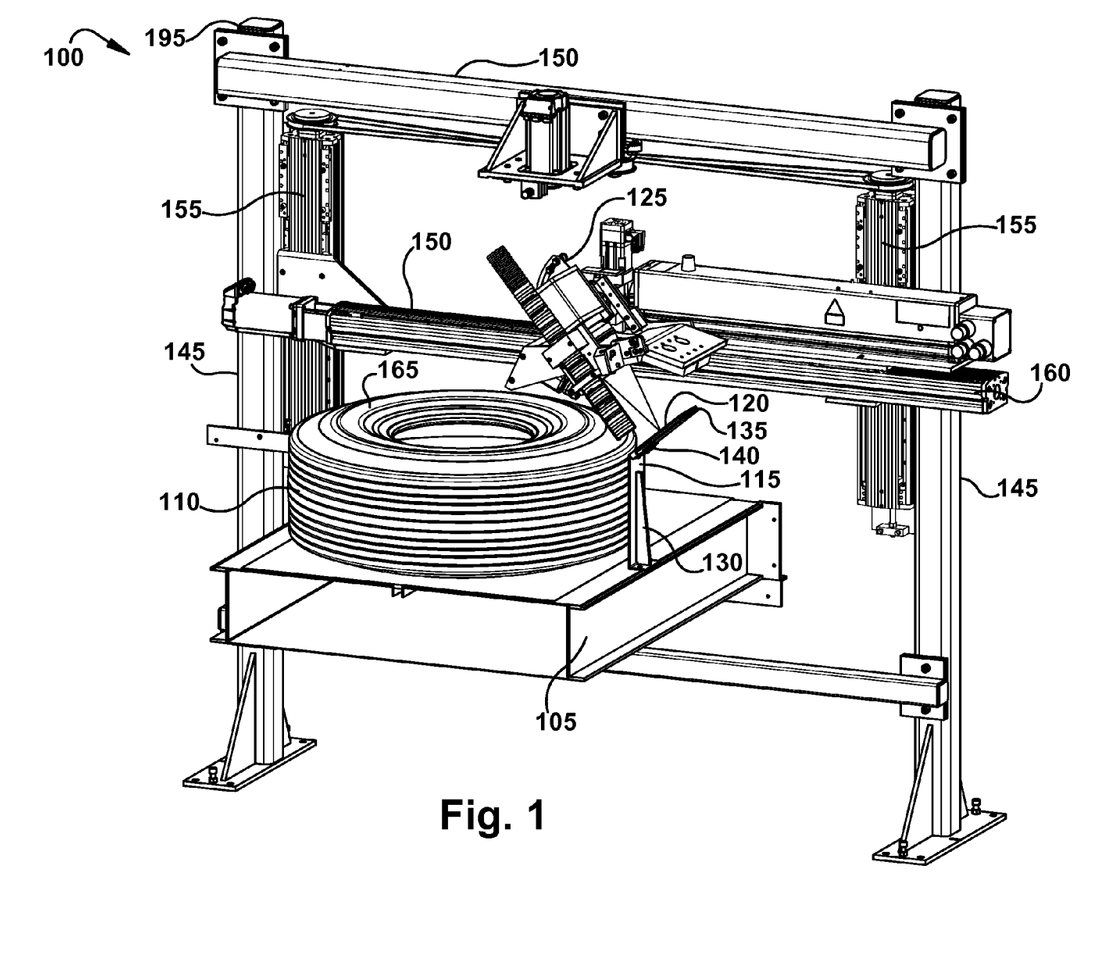
FIG. 1 illustrates an isometric view of one embodiment of laser etching and laser diode testing system.

FIG. 1 illustrates an isometric view of a laser etching and laser diode testing system 100, including a production line 105 comprising a conveyor having a tire 110, a sample holding device 115 configured to hold a sample 120, a laser assembly 125 having a laser diode (not shown), and a servo assembly 195. The sample holding device 115 includes a vertical structure 130 and a sample receiving section 135. Sample receiving section 135 is configured to maintain sample 120 into a plane so sample 120 is at a substantially constant distance $D_1$ from a tip (not shown) of laser assembly 125. In the illustrated embodiment, sample section 135 includes a locking device 140 that is spring loaded. In another embodiment (not shown), sample section 135 includes a locking device 140 that bolts sample section 135 together. Sample holding device 115 is adjacent to the production line 105. In another embodiment (not shown), sample holding device 115 is spaced from the production line 105.

In the illustrated embodiment, sample 120 is a rubber material substantially similar to the sidewall rubber of tire 110. In another embodiment (not shown), sample 120 includes polymeric materials, metals, stone, glass, and natural materials, such as wood, hard papers, fiberboards, and leather. In yet another embodiment (not shown), sample 120 is replaced with a sensor that measures the strength (e.g., power) of the laser beam from laser assembly 125. If the strength of the laser beam is not within an acceptable range, then an alarm is triggered.

In the illustrated embodiment, servo assembly 195 comprises at least one vertical section 145 and at least one horizontal section 150, both comprising structural components and track components. In the illustrated embodiment, two vertical sections 145 are mounted adjacent to production line 105. In an alternative embodiment, at least one vertical section 145 is mounted to a structural support in proximity to production line 105. In the illustrated embodiment, two vertical sections 145 include tracks 155 that are configured to move horizontal section 150 up and down. The horizontal section 150 is supported by the two vertical sections 145 and includes a track 160. However, it should be understood that the two vertical sections are merely exemplary, and that the laser etching and laser diode testing system 100 may be employed with other embodiments, such as a robotic arm and the like.

Horizontal section 150 supports laser assembly 125. Laser assembly 125 moves on track 160, enabling laser assembly 125 to move in at least one horizontal direction (i.e., left, right, forward, and backward). Further, laser assembly 125 is configured to rotate around a vertical axis (not shown). In another embodiment (not shown), laser assembly 125 is configured to rotate about at least one of the following: a vertical axis, a horizontal axis, and an axis with a vertical and a horizontal degree. However, it should be understood that the illustrated servo assembly and tracks are merely exemplary, and that the laser etching and laser diode testing system 100 may be employed with other embodiments, such as a robotic arm and the like.

Figure 2:
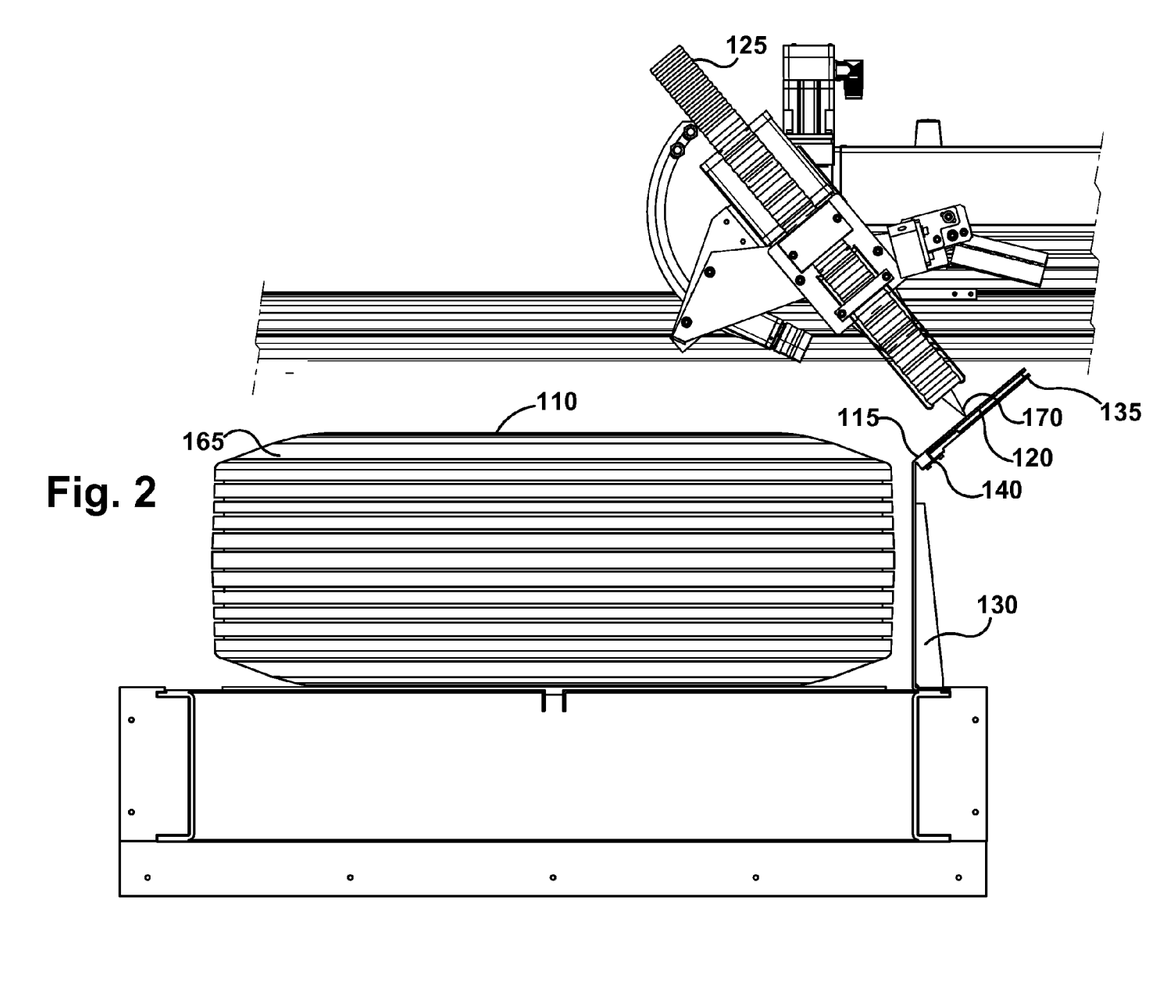
FIG. 2 illustrates a front close-up view of a laser, sample piece, and sample piece holder of the laser etching and laser diode testing system.

FIG. 2 illustrates a front close-up view of a portion of the laser etching and laser diode testing system 100, including laser assembly 125, sample 120, and sample holding device 115. In one exemplary embodiment, laser assembly 125 further comprises a laser, a laser diode stack, at least one mirror, and a focus lens. Laser assembly 125 may include at least one of the following types of lasers: yttrium aluminium garnet ("YAG") laser and $CO_2$ laser. In the illustrated embodiment, sample 120 is at a substantially constant distance $D_1$ from a tip 170 of the exemplary laser assembly 125. The laser is configured to etch indicia (not shown) on a sidewall 165 of the tire 110 and etch at least one line (not shown) in sample 120 on sample holding device 115. The sidewall refers to that portion of the tire between a footprint of a tread and a bead. In another embodiment (not shown), a laser assembly of an alternative design is used in place of laser assembly 125.

Figure 3:
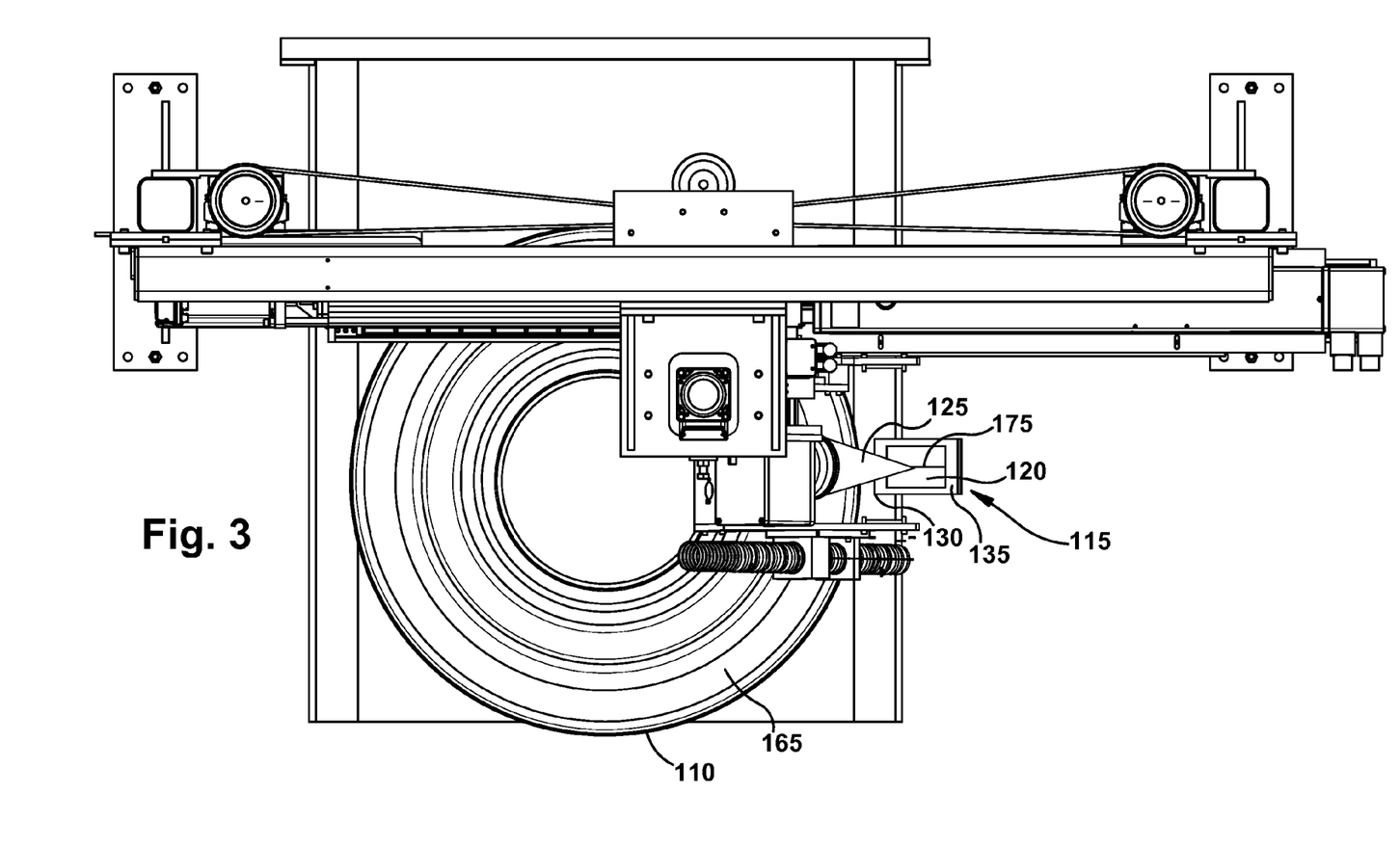
FIG. 3 illustrates a top view of the laser, the sample piece, and the sample piece holder of the laser etching and laser diode testing system.

FIG. 3 illustrates a top view of the laser etching and laser diode testing system 100, including laser assembly 125, sample 120, and sample holding device 115. In the illustrated embodiment, laser assembly 125 is shown etching at least one line 175 across sample 120 as sample holding device 115 maintains sample 120 in a plane, i.e., a planar surface. Laser assembly 125 may be further configured to etch at least one of a date, a symbol, a machine code, a dot, and an operator code into the sample 120.

Figure 4:
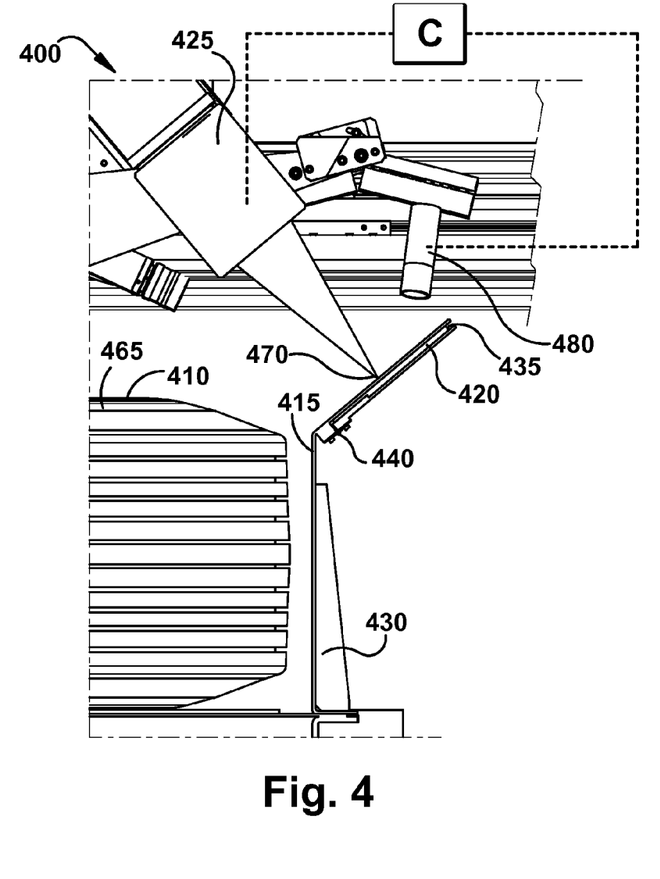
FIG. 4 illustrates a front view of an alternative embodiment of a laser etching and laser diode testing system.

FIG. 4 illustrates a front close-up view of an alternative embodiment of a laser etching and laser diode testing system 400. Laser etching and laser diode testing system 400 is substantially similar to the laser etching and laser diode testing system 100 of FIG. 1, except it includes an automatic depth measuring device 480. In one embodiment, automatic depth measuring device 480 may be a device that uses light to measure depth, i.e., laser displacement method. In an alternative embodiment, automatic depth measuring device 480 is an ultrasonic depth measuring device, using sound waves to measure the depth of a line 470. In one particular embodiment, automatic depth measuring device 480 may be a laser displacement sensor manufactured by KEYENCE, model number LJ, G015J. In the illustrated embodiment, automatic depth measuring device 480 is mounted adjacent to the sample holding device 415, e.g., above or to the side of the sample holding device 415. In another embodiment (not shown), automatic depth measuring device 480 is spaced from the sample holding device 415.

In the illustrated embodiment, laser etching and laser diode testing system 400 further includes a control system or computer C, a programmable logic controller, connecting wires, electronic eyes, controls, and the like. The control system or computer C is configured to monitor a number of tires produced and determine a time of use for the laser etching and laser diode testing system 400. In one exemplary embodiment, control system or computer C is configured to use the laser etching and laser diode testing system 400 once a shift, e.g., at the beginning of every shift. In another embodiment, control system or computer C is configured to use the laser etching and laser diode testing system 400 at specified times during the day, e.g., at 7 AM, 3 PM, and 11 PM. In yet another embodiment, control system or computer C is configured to use the laser etching and laser diode testing system 400 when a certain number of tires are provided, e.g., from about 1 and 500 tires. The laser etching and laser diode testing system 400 and measurements from the automatic depth measuring device 480 are sent to control system or computer C during production or at the end of a cycle. If a hard wire transmission technique is selected, then dashed lines in FIG. 4 represent wires that the data is sent through to control system or computer C. If a wireless transmission technique is selected, then dashed lines in FIG. 4 represent wireless transmitters, receivers, and the like. Unless specifically stated otherwise, it should be appreciated that throughout this detailed description, terms like computer system, computer, processing, computing, calculating, determining, displaying, or the like, refer to physical components, actions, and processes of a computer system, logic, processor, hardware and/or software, or a similar electronic device that manipulates and transforms data represented as physical (electronic) quantities.

In an alternative embodiment (not shown), laser etching and laser diode testing system 400 may include an in-line laser diode testing system. The in-line laser diode testing system includes a production line such as the production line described above and further includes an in-line automatic depth measuring device. The in-line automatic depth measuring device is capable of measuring the etch depth on a sidewall of a tire as the tire moves along the production line (i.e., the laser assembly does not need to move away from production). Because the depth measuring device is in-line, a sample and sample holding device are not required and the laser assembly can continue to etch indicia on production tires.

Figure 5:
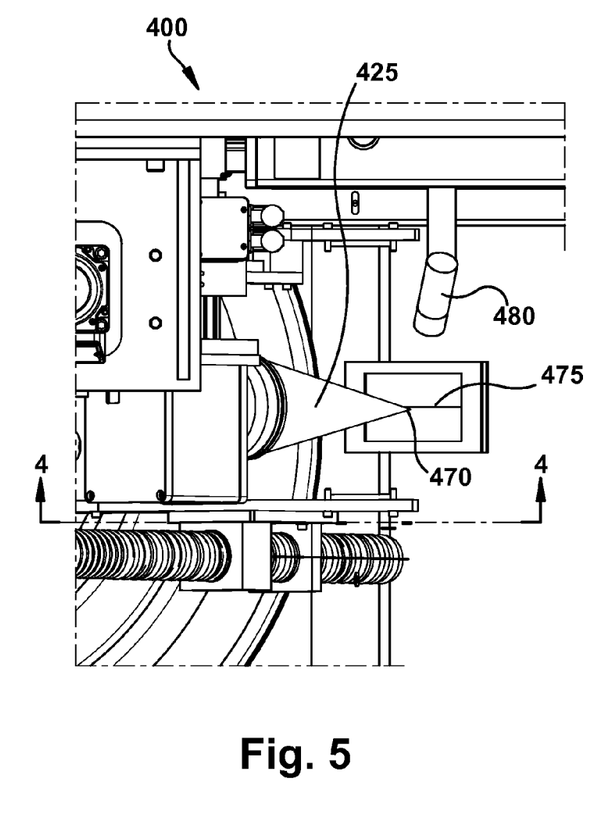
FIG. 5 illustrates a top view of the alternative embodiment of the laser etching and laser diode testing system.

FIG. 5 illustrates a top view of laser etching and laser diode testing system 400. In the illustrated embodiment, laser assembly 425 and automatic depth measuring device 480 are configured so laser assembly 425 can etch line 475 and depth measuring device 480 can determine the depth of the line 475. In an alternative embodiment (not shown), depth measuring device 480 can be installed at a separate location, spaced from laser etching and laser diode testing system 400.

Figure 6A:
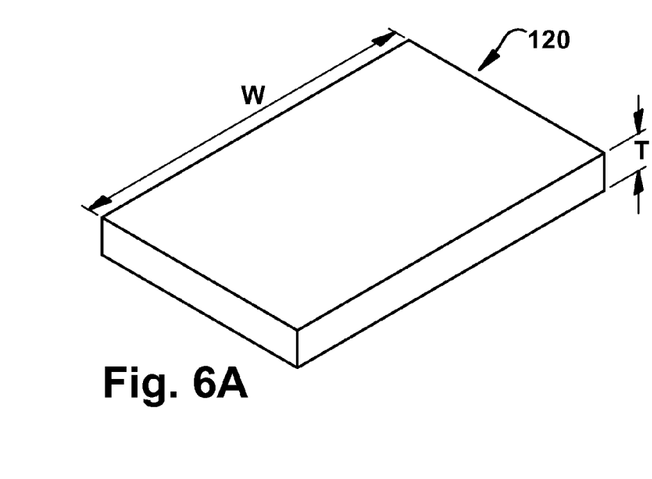
FIGS. 6A and 6B illustrate isometric views of one embodiment of a sample piece before and after a laser etches a line into the sample.
Figure 6B:
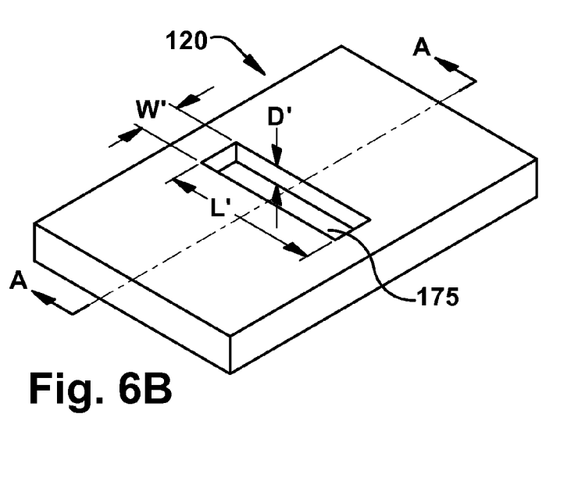

FIGS. 6A and 6B illustrate isometric views of sample 120 before and after a laser etches an etch line 175 into sample 120 in laser etching and laser diode testing system 100 or laser etching and laser diode testing system 400. Illustrated in FIGS. 6A and 6B, sample 120 is quadrilateral in shape. In other embodiments (not shown), sample 120 is at least one of the following shapes: circle, pentagon, hexagon, irregular shape, and any other shape. In the illustrated embodiments, sample 120 has a thickness T of at least 0.1 inch, a width W of at least 4 inches, and a height H of at least 3 inches. In an alternative embodiment (not shown), sample 120 has a thickness T of at least 0.1 inch, a width W of at least 1 inch, and a height H of at least 1 inch. In yet another embodiment (not shown), sample 120 has a thickness T of at least 0.25 inch, a width W of at least 4 inches, and a height H of at least 3 inches.

Illustrated in FIG. 6B, sample 120 includes an etch line 175. Etch line 175 has a width W', a length L', and a depth D'. In the illustrated embodiment, etch line 175 has a width W' of at least 0.01 inch and a length L' of at least 1 inch. In other embodiments (not shown), etch line 175 has a length L' of between about 0.25 inch to about 4 inches or more. In yet another embodiment (not shown), etch line 175 has a width W' of between about 0.005 inch to about 0.05 inch or more. In yet another embodiment, sample 120 includes at least one etch line 175.

Figure 7A:
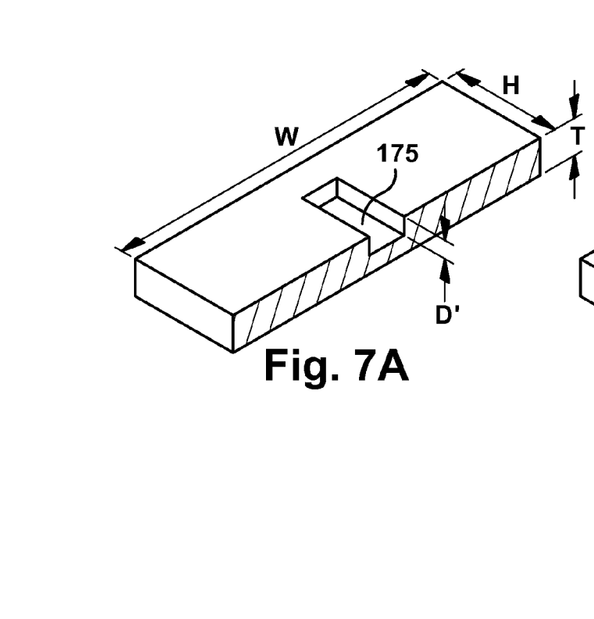
FIGS. 7A-7C are isometric cross-sections of embodiments of the sample, along the line A-A of FIG. 6B.
Figure 7B:
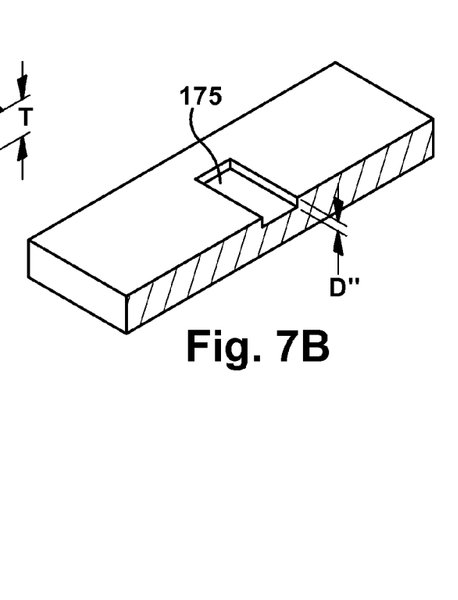
Figure 7C:
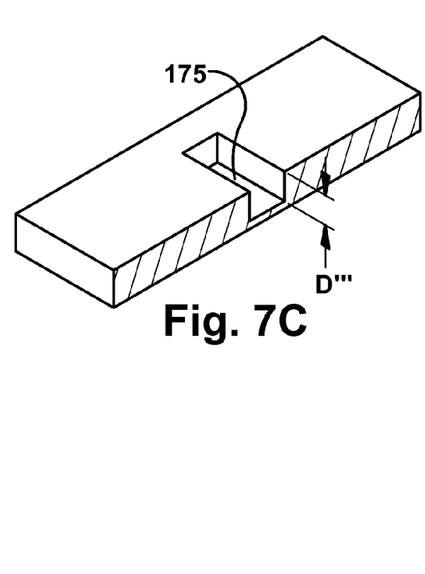

FIGS. 7A-7C are isometric cross-sections of sample 120, along the line A-A of FIG. 6B. Illustrated in FIG. 7A is a cross section of sample 120 having a thickness T and etch line 175 having an acceptable depth D'. In one known embodiment, an acceptable depth range is from about 0.01 inch to about 0.05 inch. In another known embodiment, an acceptable depth range is from about 0.005 inch to about 0.05 inch. In yet another embodiment, an acceptable depth range is from about 0.01 inch to about 0.02 inch. In another known embodiment, an acceptable depth range is from about 0.02 inch to about 0.025 inch.

FIG. 7B illustrates a cross section of sample 120 having a thickness T and an etch line 175 having an unacceptably shallow depth D″. In one known embodiment, a depth of 0.01 inch is considered shallow. A shallow depth may be an indicator that an etch is not within design requirements.

FIG. $D_1$ illustrates a cross section of sample 120 having a thickness T and an etch line 175 having an unacceptably deep depth D‴. In one known embodiment, a depth D‴ of more than about 0.05 inch is considered deep. A deep depth may be an indicator that an etch is not within design requirements.

Additionally, the width of the etch line 175 can be measured and compared to design requirements. Further, the length of the etch line 175 can be measured and compared to design requirements. For example, the etch line 175 can be considered outside design requirements if the length of the etch line is not continuous. In another example, etch line 175 can be considered outside design requirements if the width of the etch line varies by a specified percentage along its length. In yet another embodiment, variances between current and previous widths and lengths of the etch line 175 in sample 120 may be indicative of performance issues with the laser etching and laser diode testing system 100.

Figure 8:
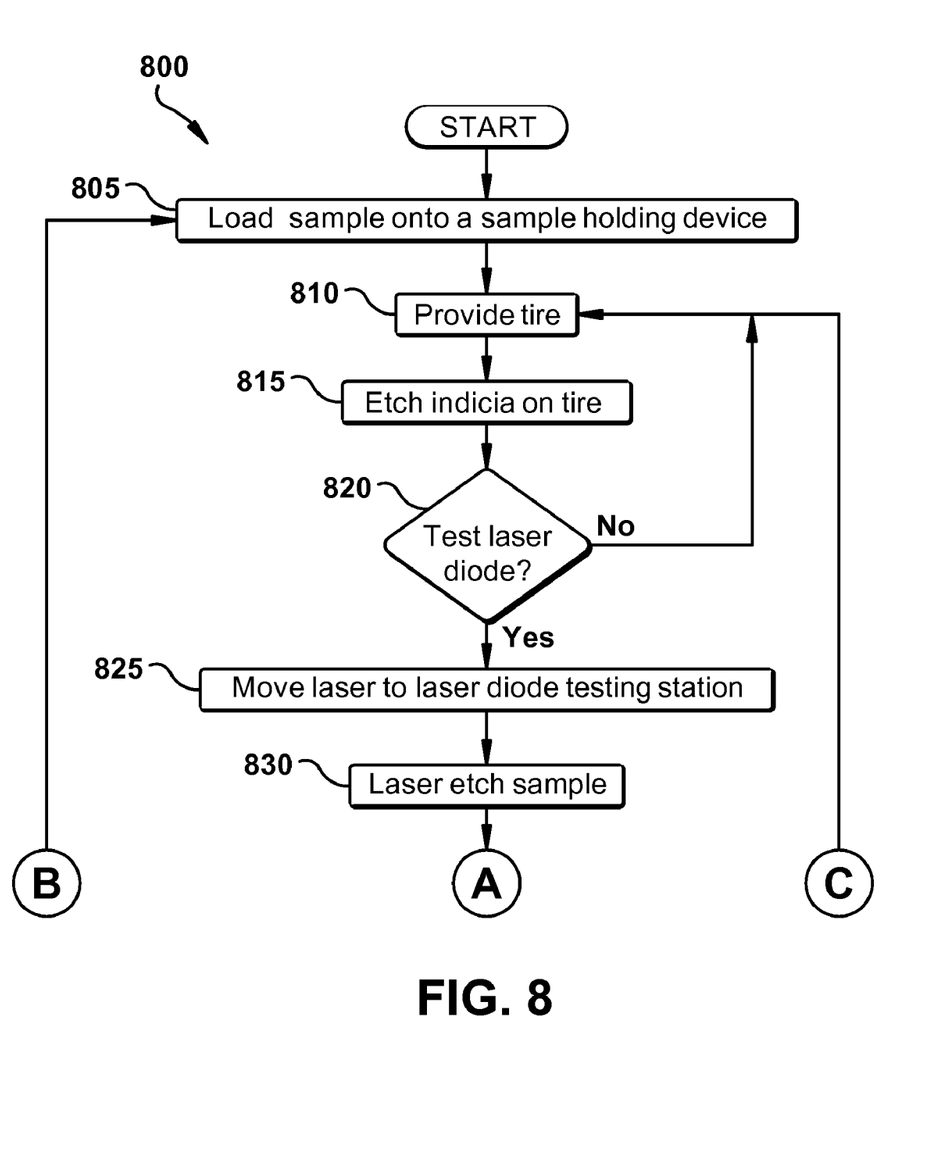
FIG. 8 is a flow chart illustrating one embodiment of a laser diode testing method.

FIG. 8 is a flowchart illustrating a portion of a laser etching and laser diode testing method 800. As shown in FIG. 8, an operator loads a rubber sample onto a sample holding device at 805. A tire is provided at 810 and a laser assembly etches indicia onto the tire at 815. At 820, an operator or a computer determines whether the laser diode in the laser assembly should be tested. If it is not time to test the laser diode at 820, then the method continues to provide tires and etch indicia on the tires at 810 and at 815. If it is time to test the laser diode at 820, then the method moves the laser assembly to the laser diode testing station at 825. The laser assembly then etches the sample at 830. The laser diode testing method 800 continues at "A," as detailed further below in explanation of FIG. 9 or FIG. 10. "B" and "C" will be explained below in relation to FIG. 9 and FIG. 10.

Figure 9:
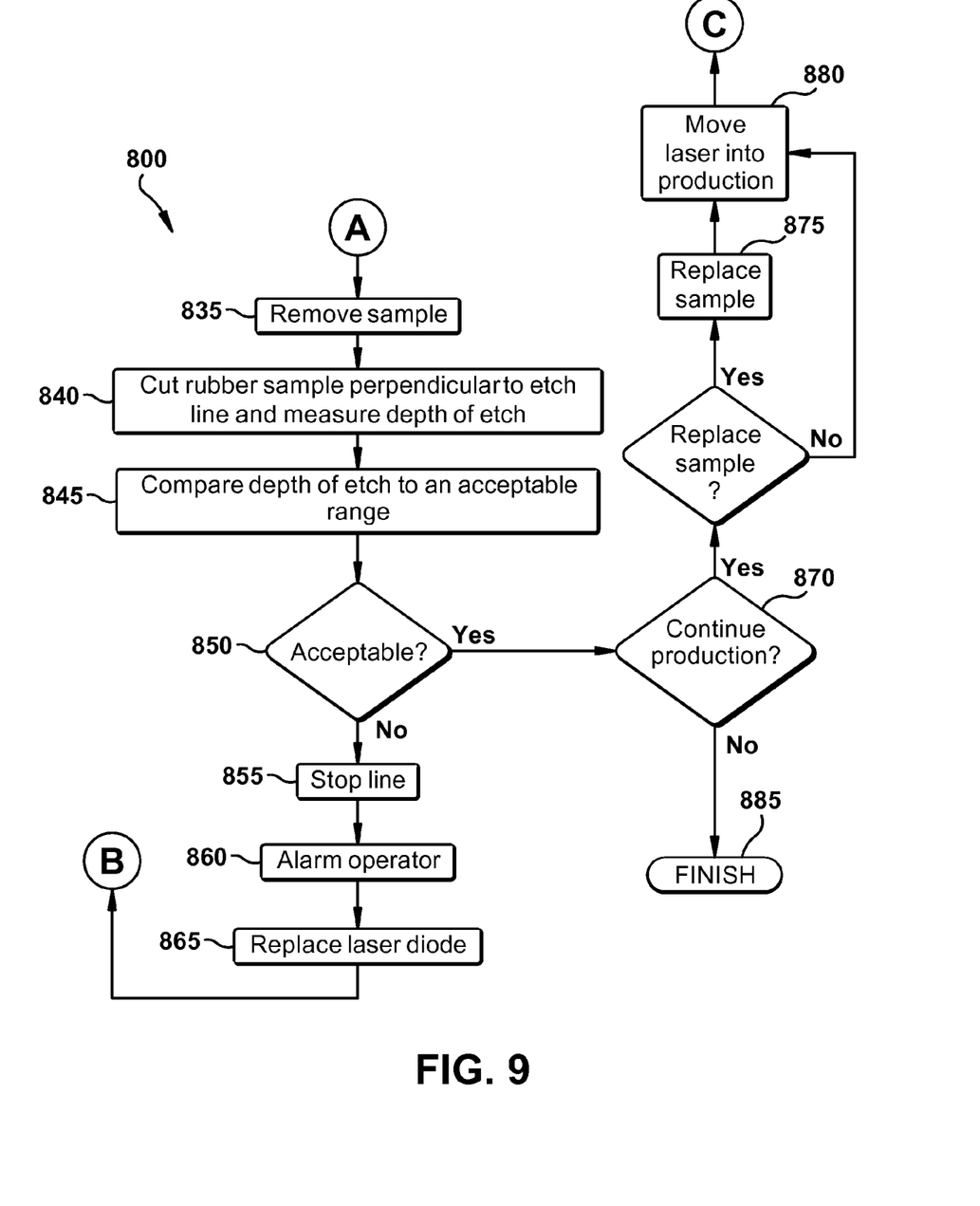
FIG. 9 is a flow chart illustrating one embodiment of a manual method of etch measurement.

FIG. 9 is a flowchart illustrating a second portion of a laser etching and laser diode testing method 800. After the laser assembly etches the sample at 830 from "A," the sample is removed at 835, the sample is cut perpendicular to the etch line and the sample's etch line depth is measured at 840. An operator or system then compares the depth measurement to an acceptable range at 845. If the depth is not acceptable at 850, the production line stops at 855, an alarm notifies an operator at 860, and an operator or automated system replaces the laser diode at 865. The laser diode testing method 800 continues at "B," as detailed above in explanation of FIG. 8 (the method continues when an operator or system loads a rubber sample onto a sample holding device at 805).

If the depth is acceptable at 850, the method determines whether production should continue at 870. If production should not continue at 870, the method finishes at 885. If production should continue at 870 and the sample should be replaced, then the sample is replaced by the operator or the system at 875 and the laser moves into production at 880. If production should continue at 870 and the sample does not need to be replaced, then the laser moves into production at 880. The sample may not need to be replaced if the sample can take at least one etch line and each etch line can be inspected without compromising the entire sample. The laser diode testing method 800 continues at "C," as detailed above in explanation of FIG. 8 (the method 800 continues when tire production continues at 810).

Figure 10:
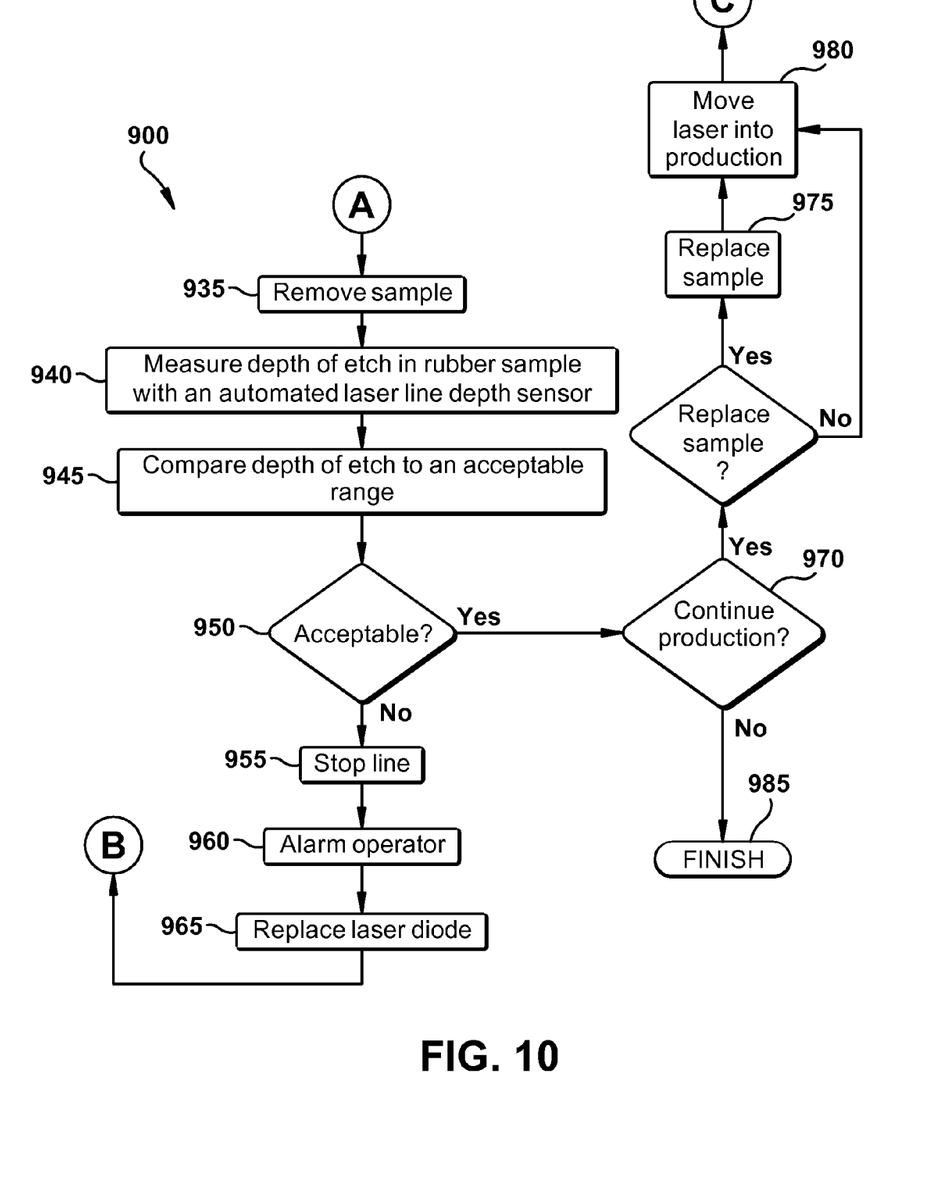
FIG. 10 is a flow chart illustrating one embodiment of an automatic method of etch measurement.

FIG. 10 is a flowchart illustrating an alternative second portion of a laser etching and laser diode testing method 900. After the laser assembly etches the sample at 830 from "A," the sample is removed at 935 so the sample's etch line depth can be automatically measured at 940. The system then compares the depth measurement to an acceptable range at 945. If the depth is not acceptable at 950, the production line stops at 955, an alarm notifies an operator at 960, and an operator or automated system replaces the laser diode at 965. The laser diode testing method 900 continues at "B," as detailed above in explanation of FIG. 8 (the method 800 continues when an operator or system loads a rubber sample onto a sample holding device at 805).

If the depth is acceptable at 950, the method determines whether production should continue at 970. If production should not continue at 970, the method finishes at 985. If production should continue at 970 and the sample should be replaced, then the sample is replaced by the operator or the system at 975 and the laser moves into production at 980. If production should continue at 970 and the sample does not need to be replaced, then the laser moves into production at 980. The laser diode testing method 900 continues at "C," as detailed above in explanation of FIG. 8 (the method 800 continues when tire production continues at 810).

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application illustrates various embodiments, and while these embodiments have been described in some detail, it is not the intention of the applicant to restrict or in any way limit the scope of the appended claims to such detail. Additional advantages and modifications will readily appear to those skilled in the art. Therefore, the invention, in its broader aspects, is not limited to the specific details, the representative embodiments, and illustrative examples shown and described. Accordingly, departures may be made from such details without departing from the spirit or scope of the applicant's general inventive concept.

What is claimed is:

1. An apparatus for verifying a laser etch on a rubber sample, the apparatus comprising:
   a tire production line;
   a sample holding device configured to hold a rubber sample spaced from the tire production line;
   a laser having a diode; and
   a servo-assembly operatively connected to the laser,
   wherein the servo-assembly is configured to move the laser to etch indicia on a sidewall of a tire on the tire production line and is further configured to move the laser to etch at least one line in a rubber sample on the sample holding device.

2. The apparatus of claim 1, wherein the holding device is spring loaded to force the rubber sample to have a planar surface that maintains a substantially constant distance from the laser.

3. The apparatus of claim 1, wherein the rubber sample is quadrilateral in shape and has a thickness greater than about 0.1 inch.

4. The apparatus of claim 1, wherein the at least one line has a length from about 0.1 inch to about 4 inches.

5. The apparatus of claim 1, wherein the servo-assembly is further configured to move the laser to etch indicia on the rubber sample, wherein the indicia comprises at least one of a date, a date symbol, a dot, a machine code, and an operator code.

6. The apparatus of claim 1, further comprising a control system configured to monitor a number of tires produced and determine a time for moving the laser to etch the at least one line in the rubber sample.

7. The apparatus of claim 1, wherein the servo-assembly is configured to move the laser to etch at least one line and indicia into the rubber sample and wherein the at least one line and the indicia have a depth between about 0.010 inch to about 0.050 inch.

8. A method for verifying a laser etch, the method comprising:
moving a production tire on a production line;
etching the production tire with a laser;
interrupting the laser;
moving the laser to a laser diode testing location spaced from the production line;
loading a rubber sample in a holding device at the laser diode testing location spaced from the production line;
etching at least one line into the rubber sample with the laser;
manually measuring a depth of the at least one line; and
comparing the depth of the at least one line to an acceptable line depth range.

9. The method of claim 8, further comprising stopping the production line upon determining that the depth of the at least one line is outside the acceptable line depth range, and replacing a laser diode with a replacement laser diode.

10. The method of claim 8, further comprising continuing the production line upon determining that the depth of the at least one line is within the acceptable line depth range.

11. A method for verifying a laser etch, the method comprising:
conveying at least one tire along a production line into a laser etching station;
etching indicia on a sidewall of a tire with a laser;
loading a rubber sample in a holding device configured to hold the rubber sample spaced from the production line;
moving the laser to the rubber sample;
etching at least one line into the rubber sample with the laser;
measuring a depth of the at least one line with an automated depth sensor; and
comparing the depth of the at least one line to an acceptable line depth range.

12. The method of claim 11, wherein the holding device is a spring loaded assembly.

13. The method of claim 11, wherein the rubber sample is from about 3 inches to about 7 inches in width, from about 2 inches to about 6 inches in height, and has a thickness greater than about 0.1 inch.

14. The method of claim 11, wherein the at least one line has a length from about 0.10 inch to about 4 inches.

15. The method of claim 11, further comprising etching at least one of a date, a machine code, and an operator code into the rubber sample.

16. The method of claim 11, wherein the loading the rubber sample in the holding device, the moving the laser to the rubber sample, the etching at least one line into the rubber sample with the laser, the measuring the depth of the line with the automated depth sensor, and the comparing the depth of the at least one line to the acceptable line depth range are each performed at least two times per day.

17. The method of claim 11, wherein the conveying at least one tire along the production line into the laser etching station includes conveying between 1 and 500 tires.

18. The method of claim 11, further comprising stopping the production line, upon determining that the depth of the at least one line is outside the acceptable line depth range, identifying a suspect range of tires, and replacing a laser diode with a replacement laser diode.

19. The method of claim 11, further comprising measuring a depth of the indicia on the sidewall of the tire.

20. The method of claim 11, further comprising repeating the conveying the at least one tire along a production line into a laser etching station upon determining that the depth of the at least one line is within the acceptable line depth range.

* * * * *